United States Patent [19]

Hoppe et al.

[11] Patent Number: 5,412,653
[45] Date of Patent: May 2, 1995

[54] DYNAMIC SWITCH CASCADING SYSTEM

[75] Inventors: Karl H. Hoppe, Ulster Park; Laura H. McGoogan, Cary, N.C.; Leon Skarshinski, Red Hook, N.Y.; Michael E. Underkoffler, Cary, N.C.

[73] Assignee: International Business Machines Corporation, Armonk, N.Y.

[21] Appl. No.: 138,288

[22] Filed: Oct. 15, 1993

[51] Int. Cl.⁶ ................................................ H04J 3/14
[52] U.S. Cl. ................................ 370/58.2; 340/825.5
[58] Field of Search ................ 370/58.1, 58.2, 58.3, 370/94.1, 94.3, 60, 60.1, 54, 56, 85.1, 53, 16, 17, 65.5, 63, 85.5; 340/827, 825.02, 826, 825.52, 825.03, 825.79, 825.15, 825.5, 825.51; 379/271, 272, 273, 274, 276, 219–221; 395/325, 400, 425

[56] References Cited

U.S. PATENT DOCUMENTS

| | | | |
|---|---|---|---|
| 4,512,011 | 4/1985 | Turner | 370/60 |
| 4,763,321 | 8/1988 | Calvignac et al. | 370/94.1 |
| 4,864,558 | 9/1989 | Imagawa et al. | 370/60 |
| 5,014,266 | 5/1991 | Bales et al. | 370/60.1 |
| 5,020,052 | 5/1991 | DePrycker et al. | 370/60 |
| 5,099,473 | 3/1992 | Gupta et al. | 370/56 |
| 5,111,198 | 5/1992 | Kuszmaul | 340/825.52 |
| 5,119,366 | 6/1992 | Ardon et al. | 370/54 |
| 5,144,293 | 9/1992 | Rouse | 340/825.02 |
| 5,179,558 | 1/1993 | Thacker et al. | 370/94.3 |
| 5,260,934 | 11/1993 | Tanaka et al. | 370/54 |

OTHER PUBLICATIONS

ANSI Standard, Fibre Channel Physical and Signaling Interface, Rev 3.0, Jun. 16, 1992.
ANSI standard, Fibre Channel Physical and Signaling Interface, Rev 4.2, Aug. 12, 1993.
Kaiser et al., "Collision of Connect Frames in Cascaded Optical Switch", *IBM Technical Disclosure Bulletin*, vol. 33, No. 10B, Mar. 1991, pp. 457–458.

*Primary Examiner*—Douglas W. Olms
*Assistant Examiner*—Dang Ton

[57] ABSTRACT

A computer interconnection system provides dynamic switch cascading with a plurality of circuit switches having circuit switch ports coupled by a dynamic connection to provide a dynamically cascadable switching network having a plurality of nodes, including end point and switch nodes. Two individual circuit switches of the network are interconnected by a cross-link group of one or more links. The system transmits frame information including a source endpoint address and a destination endpoint address, each of which can be associated with an endpoint port or a cross-link group, and forms a connection between an endpoint port or a cross-link group to make a connection between a circuit switch port corresponding to a source endpoint address and a circuit switch port corresponding to the destination endpoint. The dynamic circuit switch connections, as applicable to dynamic switch cascade operation, is compatible with the ESCON I/O Interface Architecture or to a fabric node supporting the Class 1 service defined by the Fibre Channel ANSI Standard.

13 Claims, 9 Drawing Sheets

DYNAMIC SWITCH CASCADING SYSTEM

FIELD OF THE INVENTION

This invention is related to a system for making dynamic connections in a computer environment, and particularly to a system which provides dynamic cascading of multiple circuit switches interconnected via cross-links.

GLOSSARY OF TERMS

While dictionary meanings are also implied by certain terms used here, the following glossary of some terms may be useful.
1. The transmission medium is called a link.
2. Dynamic switch cascading is the interconnection of two or more dynamic switches using dynamic connections,
3. A dynamic switch cascade refers to a collection of dynamic switches interconnected to accomplish dynamic switch cascading.
4. A cross-link is a link used to interconnect two dynamic switches in order to accomplish dynamic switch cascading.
5. A cross-link group refers to the collection of cross-links between two individual dynamic switches.
6. There are two types of nodes, a dynamic switch node and an end-point node. A switch port refers to a link interface of a dynamic switch node and an end-point port refers to a link interface of an end-point node. A switch port is identified by a switch port number and an end-point port is identified by an interface ID.
7. A switch port that is link attached to a switch port on another switch is referred to as a cross-link switch port. A switch port that is link attached to an end-point port is referred to as an end-point switch port.
8. A dynamic switch node also has a switch internal port which shares many of the characteristics of an end-point port and allows communication between a dynamic switch node and an end-point node or another dynamic switch node.
9. An end-point address is assigned to each operational end-point port and switch internal port.
10. The major unit of transmission is a frame. A frame is transmitted by a source end-point port or switch internal port to a destination end-point port or switch internal port and contains the corresponding source and destination end-point addresses.

In the ESCON I/O Interface architecture a frame is bounded by a start-of-frame (SOF) delimiter and an end-of-frame (EOF) delimiter.

There are two types of SOF delimiters, the connect-SOF (CSOF) delimiter, which is used to initiate the establishment of a dynamic connection, and a passive-SOF (PSOF) delimiter, which has no effect on a dynamic connection, and two types of EOF delimiters, the passive-EOF (PEOF) delimiter, which has no effect on a dynamic connection, and a disconnect-EOF (DEOF) delimiter, which is used to remove a dynamic connection. A frame may have one of three valid delimiter combinations.
   a. An initiation frame has CSOF-PEOF delimiters.
   b. A passive frame has PSOF-PEOF delimiters.
   c. A disconnect frame has PSOF-DEOF delimiters.

11. A switch port capable of participating in a dynamic connection may be in one of the following port states of interest, as defined by the ESCON I/O Interface architecture.
   a. A switch port is in the inactive state when no dynamic connection with another switch port exists and it is capable of participating in a dynamic connection.
   b. A switch port enters the monolog-source (MS) state from the inactive (IN) state when an initiation frame, which is received from the link and causes a dynamic connection to be established with another switch port, is passed to the connected switch port.
   c. A switch port enters the monolog-destination (MD) state from the inactive (IN) state when a dynamic connection is established with another switch port and the initiation frame which caused the dynamic connection is received from the connected switch port.
   d. A switch port enters the dialog-2 (D2) state from:
     1) the monolog-destination (MD) state when an initiation frame received from the link, which contains destination and source endpoint addresses which are equal to the source and destination endpoint addresses, respectively, of the initiation frame which caused the establishment of the monolog connection, is passed through the dynamic connection or
     2) the monolog-source (MS) state when an initiation frame is received from the connected switch port.
   e. A switch port enters the dialog-1 (D1) state from:
     1) the monolog-destination (MD) state when a passive frame received from the link, is passed through the dynamic connection,
     2) the monolog-source (MS) state when a passive frame is received from the connected switch port, or
     3) the dialog-2 (D2) state when a disconnect frame received from the link, is passed through the dynamic connection or when a disconnect frame is received from the connected switch port.
12. An idle cross-link, as viewed by a dynamic switch node, is a cross-link associated with a cross-link switch port in the inactive state.

REFERENCES USED IN THE DISCUSSION OF THE INVENTION

During the detailed description which follows the following works will be referenced as an aid for the reader. These additional references are:
1. IBM Enterprise Systems Architecture/390 ESCON I/O Interface, IBM form no. SA22-7202-02.
2. U.S. Pat. No. 5,107,489, A Switch and its Protocol for Making Dynamic Connections, by P. J. Brown et al.
3. Introducing Enterprise Systems Connection Directors, IBM form no. GA23-0363-00.
4. ANSI standard FC-P/92-001R3.0, Fibre Channel Physical and Signaling Interface (FC-PH), Rev 3.0, working draft dated Jun. 16, 1992.

These additional references are incorporated by reference.

BACKGROUND OF THE INVENTION

As background for our invention U.S. Pat. No. 5,107,489 describes a switch and its protocol for making dynamic connections which has the basis of the switching products sold by International Business Machines Corporation under the trademark ESCON, which meets the so-called Fibre Channel Standard of ANSI referenced above as ANSI standard FC-P/92-001R3.0, Fibre Channel Physical and Signaling Interface (FC-PH).

The IBM Enterprise Systems Architecture/390 ESCON I/O Interface, hereafter referred to as the ESCON I/O Interface Architecture, does not support the interconnection of two or more dynamic circuit switches using dynamic connections, a capability hereafter referred to as dynamic switch cascading.

The standard does not define any protocols for dynamic switch cascading. This application addresses dynamic switch cascading.

SUMMARY OF THE INVENTION

The improvements which we have made achieve dynamic switch cascading in circuit switches which provides extended connectivity between a system and one or more other systems and/or I/O pools using less interconnecting links, less channels, and/or less control unit tails than otherwise required.

This invention describes switch protocols for providing a dynamic circuit switch cascading capability, in which each switch has its own switching controller, independent of other switches in the same switch cascade. These protocols provide the means to avoid deadlocks and resolve conflicting dynamic connection requirements in a dynamic switch cascade without imposing any new requirements or constraints on an end-point node. Each switch is functionally similar to the IBM ESCON Director (ref. 1, ref. 2, ref. 3) with the addition of a dynamic switch cascading capability. The dynamic circuit switch cascading function allows an end-point node to communicate with another end-point node using a communication path through two or more dynamic circuit switches using dynamic connections.

Although this invention is directed at the ESCON I/O Interface Architecture (ref. 1), it is also applicable to a peer-to-peer architecture that supports dynamic circuit switch operation, such as the Class 1 service defined by the Fibre Channel ANSI Standard (ref. 4).

These improvements are accomplished by providing a computer interconnection system having a network with a plurality of circuit switches having circuit switch ports coupled by a dynamic connection to provide a dynamically cascadable switching network having a plurality of nodes, including end point and switch nodes. The circuit switches are located in the network between the end point nodes of the network. Two individual circuit switches of the network are interconnected by a cross-link group of one or more links. The system transmits frame information including a source endpoint address and a destination endpoint address, each of which can be associated with an endpoint port or a cross-link group, and dynamically forms a connection between an endpoint port or a cross-link group to make a connection between a circuit switch port corresponding to said source endpoint address and a circuit switch port corresponding to the destination endpoint.

In accordance with our invention, a circuit switch is provided with memory means for storing its port state, and when the circuit is in a cross-link group, the state of its cross-link group.

The system prioritizes selection of an idle cross-link in a group link group so that said frame information including a source endpoint address and a destination endpoint address of any two initiation frames simultaneously passing each other in a cross-link group will pass each other of the same cross-link.

The system connections between switches in the network are made on a priority attempt basis, with a higher priority address attempted first, followed by a lower priority address, but where addressing conflicts or inhibiting conditions exist which do not permit a higher priority connection to be made, a lower priority transfer of frame information is transmitted.

This invention provides the means to satisfy the following objectives.

1. Provide operability between two or more switch nodes which support the dynamic switch cascading function and new or existing end-point nodes which conform to either the ESCON I/O Interface architecture (ref. 1) or a similar architecture based on dynamic circuit switch operation, such as the Class 1 service defined by the Fibre Channel ANSI Standard (ref. 4).
2. Minimize any impact of implementing our invention on an affected architecture and/or architected protocols by avoiding the need for any changes to end-point node operation and imposing required changes only on dynamic switch nodes which support the dynamic switch cascading function.
3. Facilitate any design of a switching controller capable of supporting a connect/disconnect rate equal to or better than provided by the IBM 9032-2 and 9033-1 ESCON directors.
4. Facilitate design tradeoffs in the allocation of functions between the switch port and the switching controller.
5. Provides, in an initiation frames passing on a cross-link scenario, as shown in FIG. 1, a structure without impediments to satisfying the dynamic connection needs of one or both of the initiation frames, enabling any required dynamic connection(s) to be established and the initiation frame(s) routed to the destination end-point with minimal connection delay.

These and other improvements are set forth in the following detailed description. For a better understanding of the invention with advantages and features, refer to the description and to the drawings.

The following additional FIGURES show examples of the initialization and passing of frames across the cross links, specifically:

1. An alphabetic character corresponds to an end-point address assigned to an end-point port which is link attached to an end-point switch port.
2. A numeric value corresponds to a switch port number.
3. A dashed line connecting two switch ports of a dynamic switch indicates the existence of a dynamic connection between those switch ports.

4. H-i→C designates an initiation frame with a source end-point address H and a destination end-point address C. The lower case characters i, p, or d are used in the directional arrow to designate an initiation, passive, or disconnect frame, respectively.

5. The H-i→C and A←-i-B initiation frames are indicated as passing each other on the cross-link between switch ports 29 and 34. This frames passing representation is intended to include all cases in which each of ports 29 and 34 is in the MD state before it can both recognize and successfully act upon the initiation frame received from the link.

Figure 2:
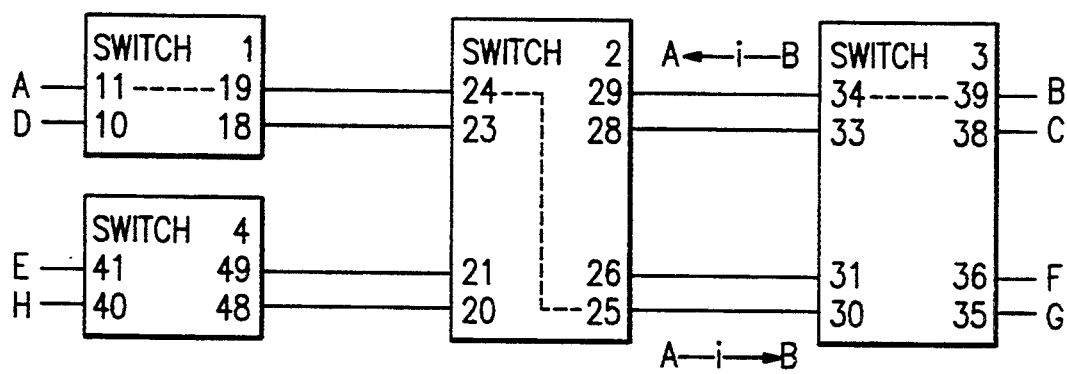
Figure 3:
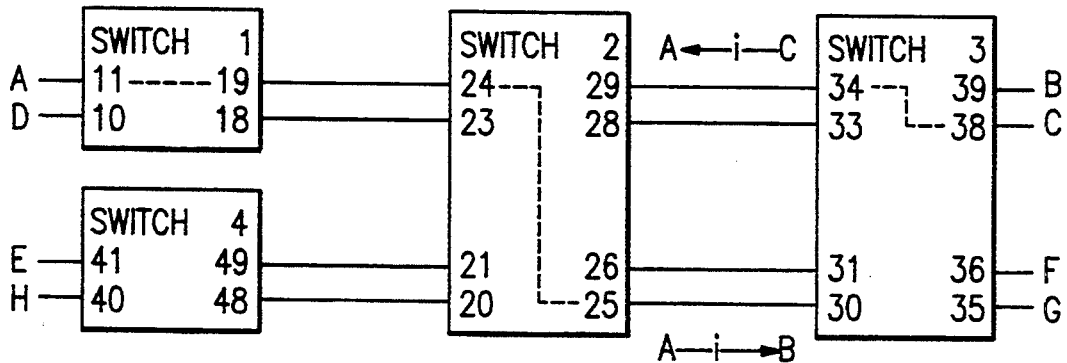
Figure 4:
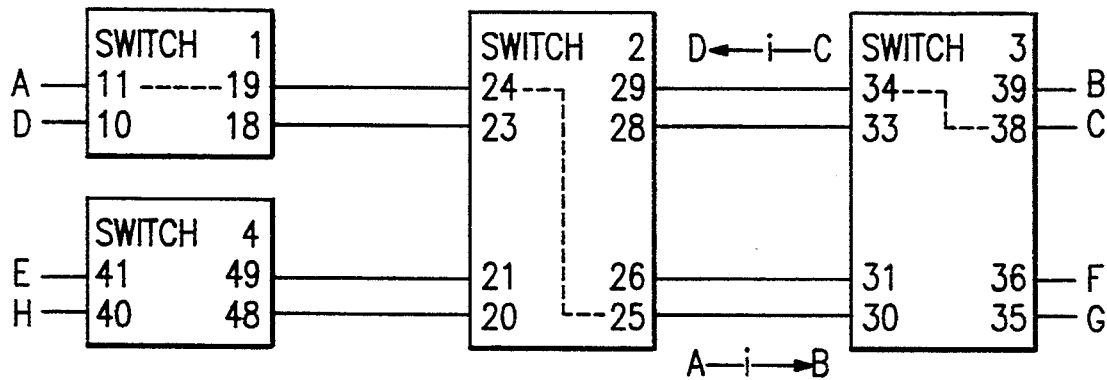

FIGS. 2, 3 and 4 illustrates other possibilities which could be used but have not been selected in accordance with the preferred embodiment of our invention.

FIG. 2 shows Initiation Frames A to B and B to A Passing on Separate Cross-Links of the Same Cross-Link Group FIG. 3 shows Initiation Frames A to B and C to A Passing on Separate Cross-Links of the Same Cross-Link Group FIG. 4 shows Initiation Frames A to B and C to D Passing on Separate Cross-Links of the Same Cross-Link Group In further illustration of the preferred embodiment of our invention the remaining FIGURES illustrate the definition of our preferred protocols for handling two initiation frames passing each other on the same cross-link to allow both connection requests to be satisfied if resources are available and no other inhibiting conditions exist.

Figure 5:
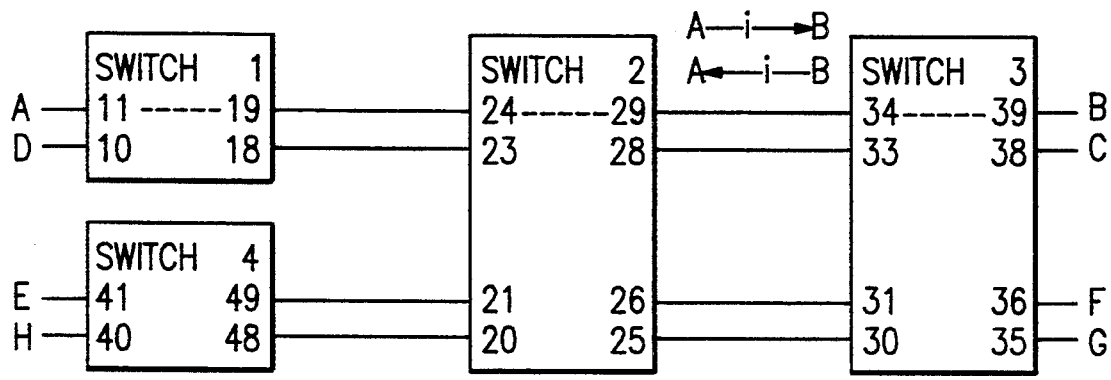
Figure 6:
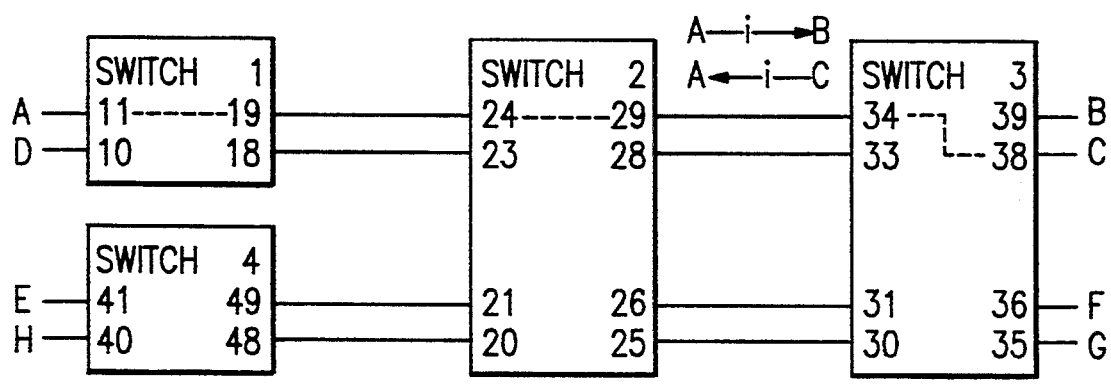
Figure 7:
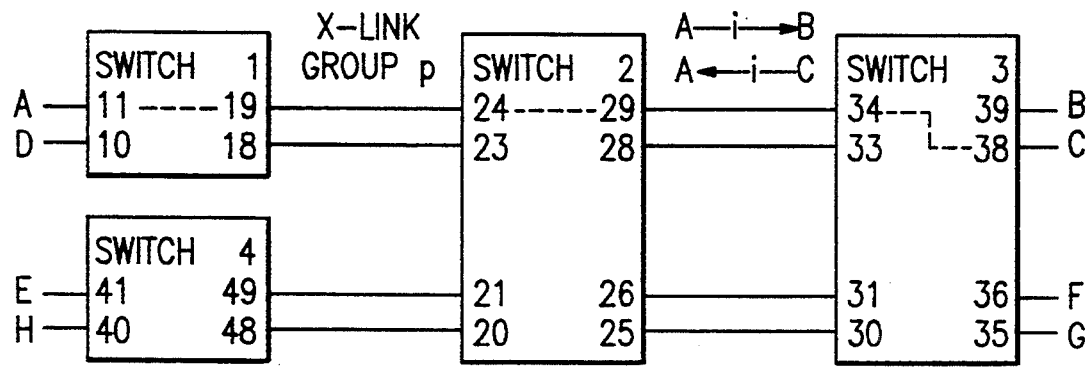
Figure 8:
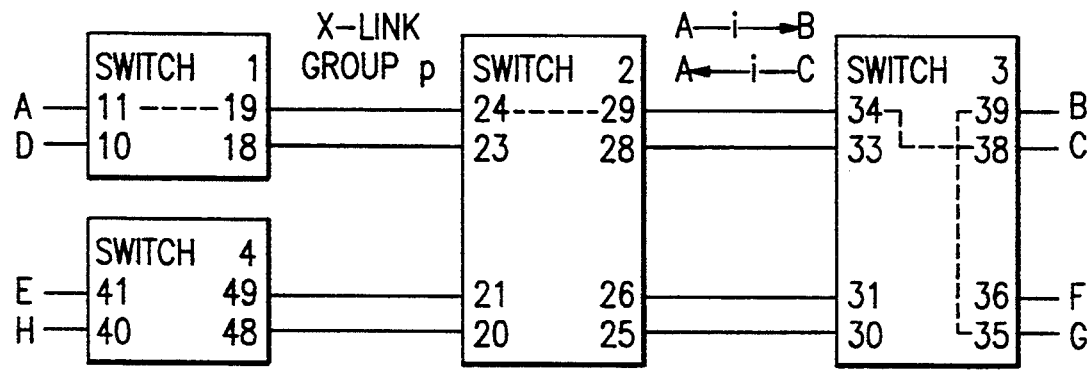
Figure 9:
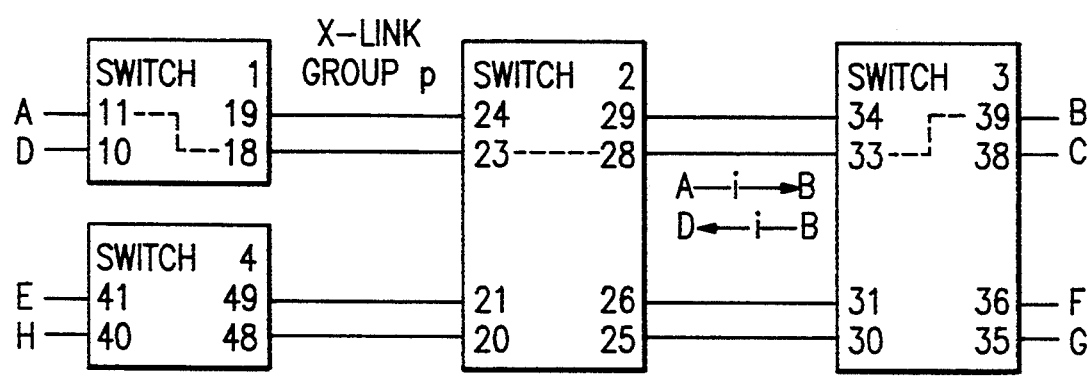
Figure 10:
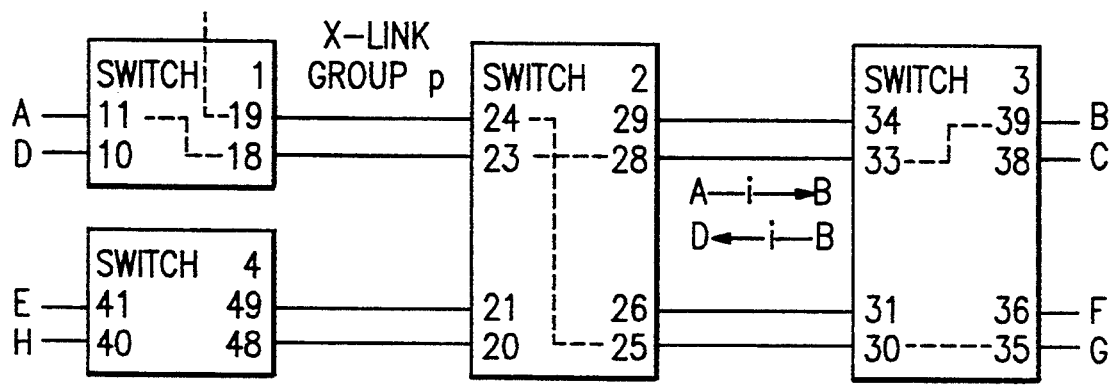
Figure 11:
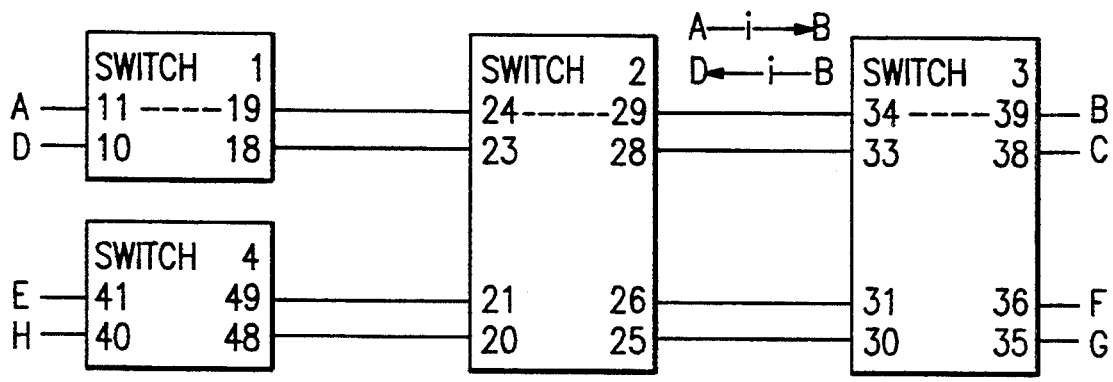
Figure 12:
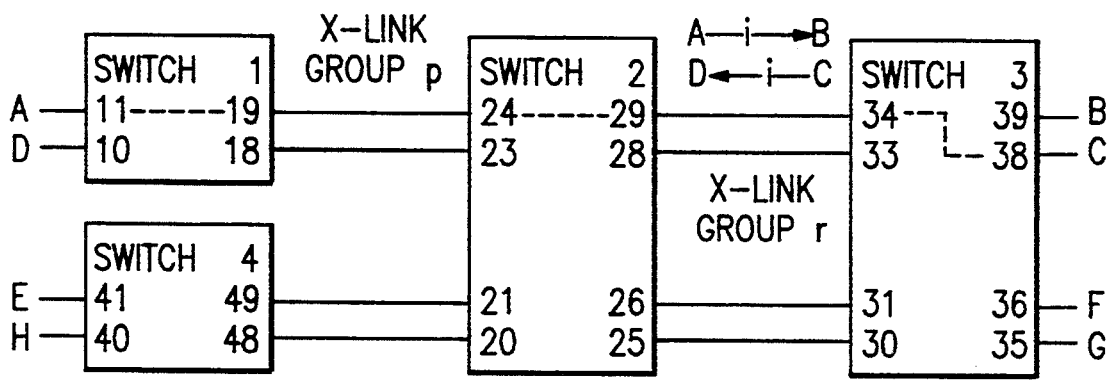
Figure 13:
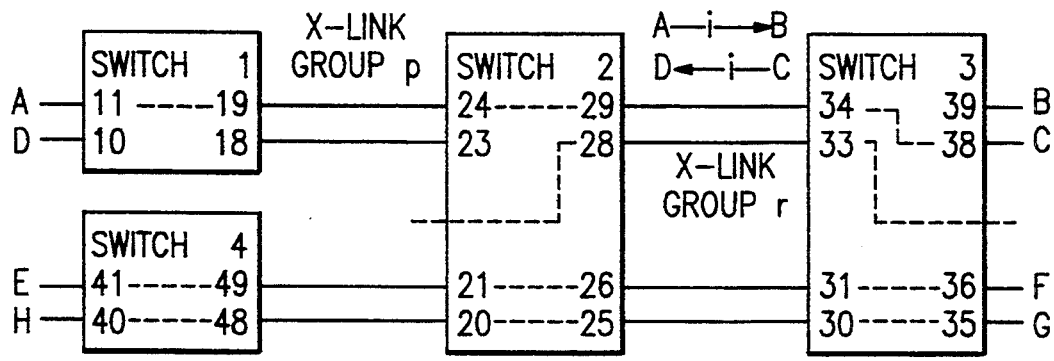
Figure 14:
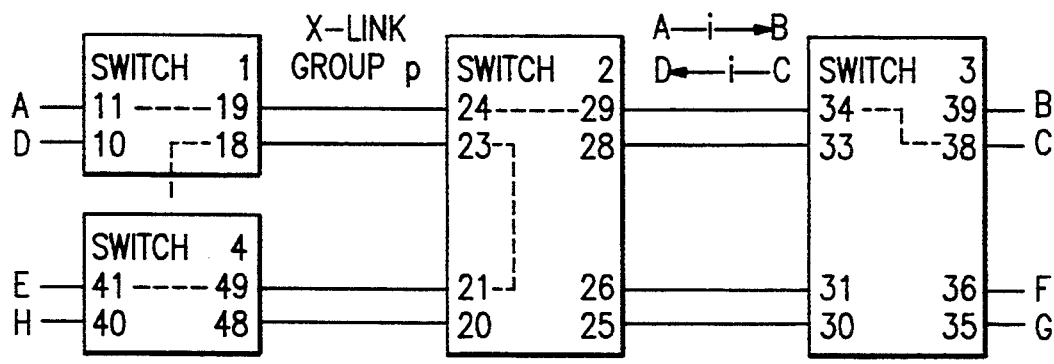
Figure 15:
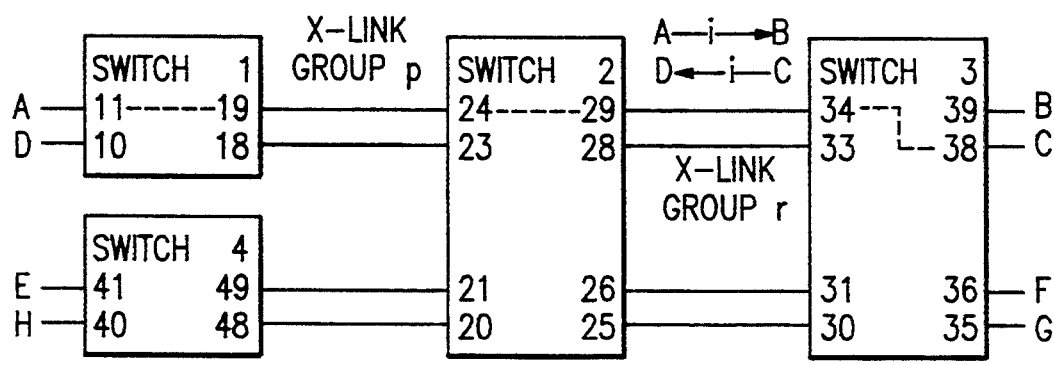
Figure 16:
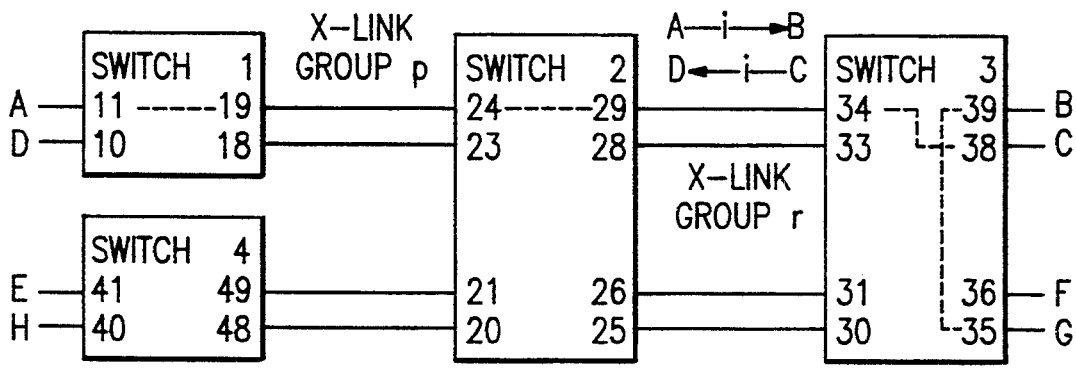
Figure 17:
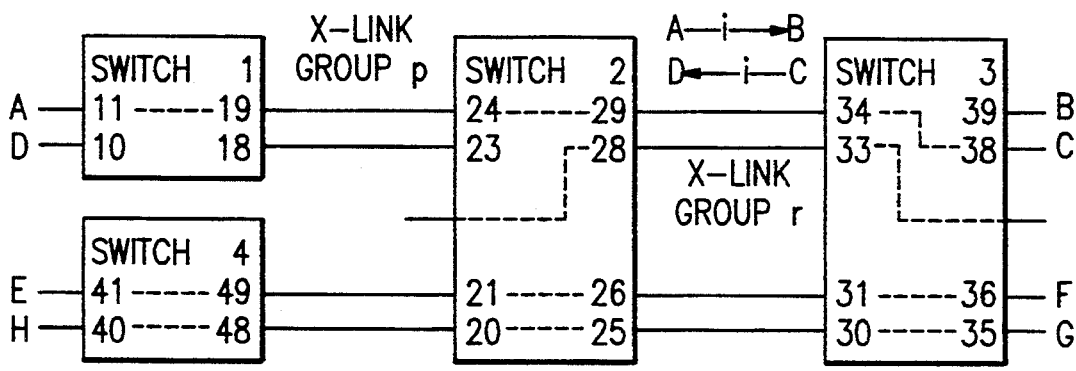
Figure 18:
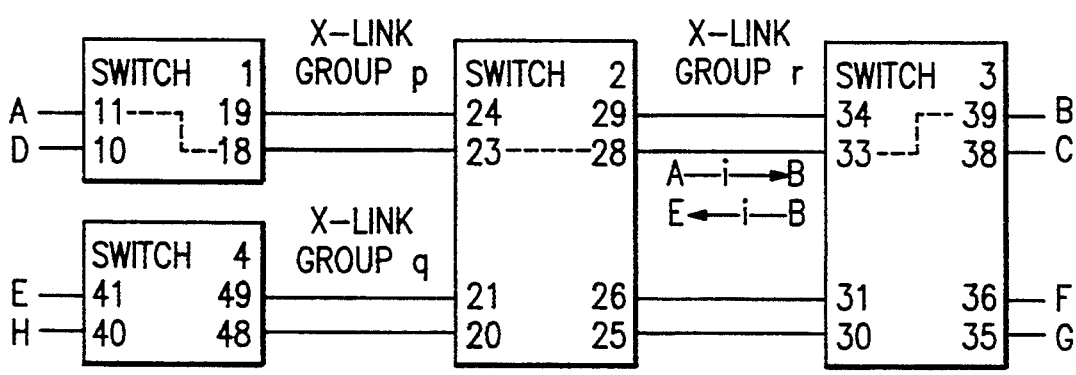
Figure 19:
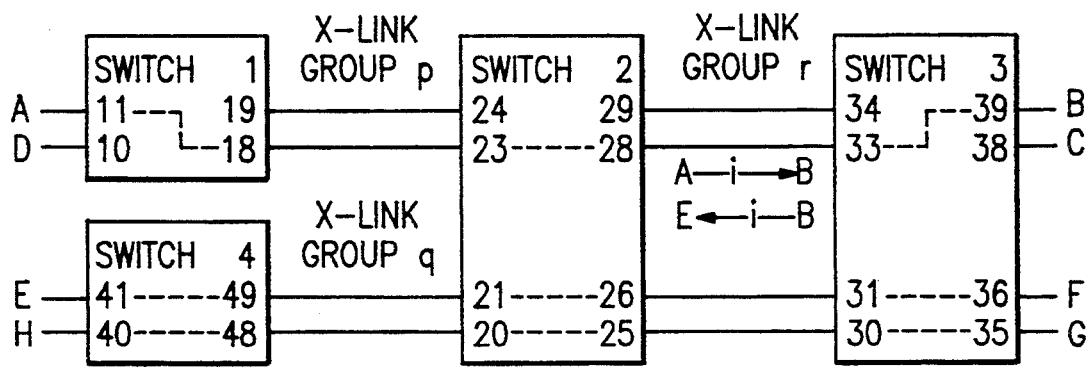
Figure 20:
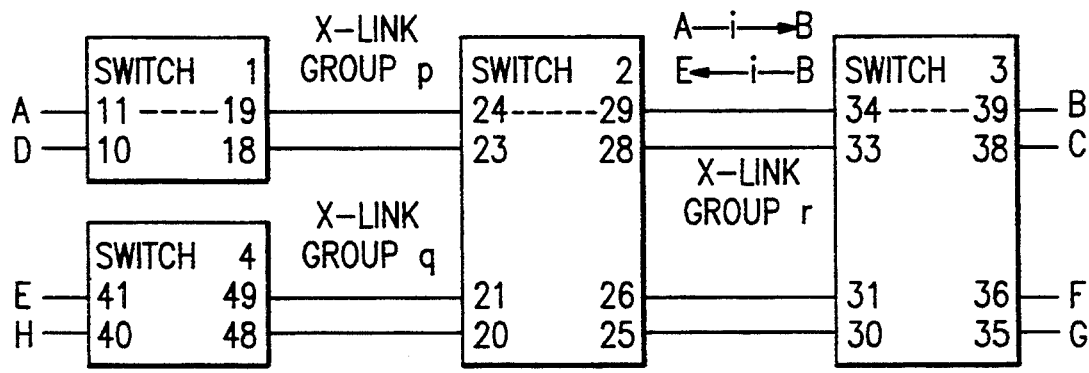
Figure 21:
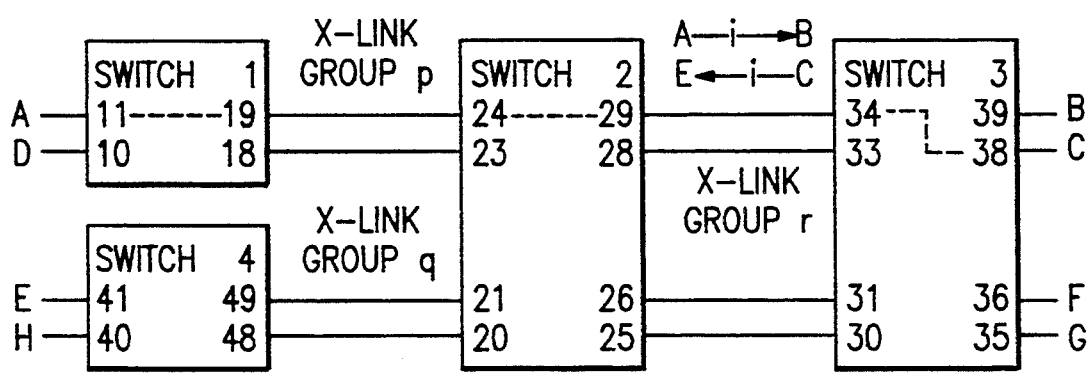
Figure 22:
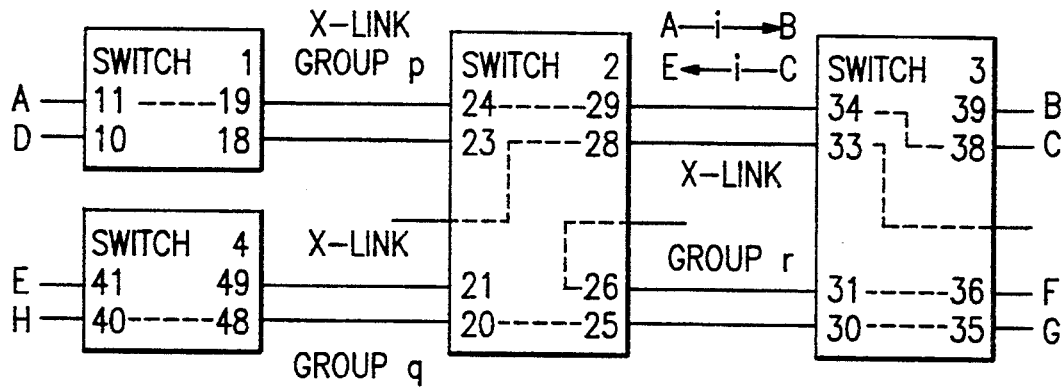
Figure 23:
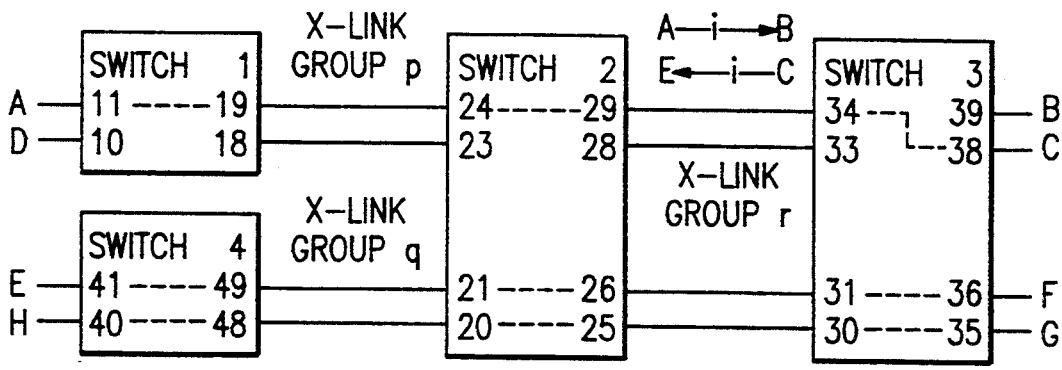
Figure 24:
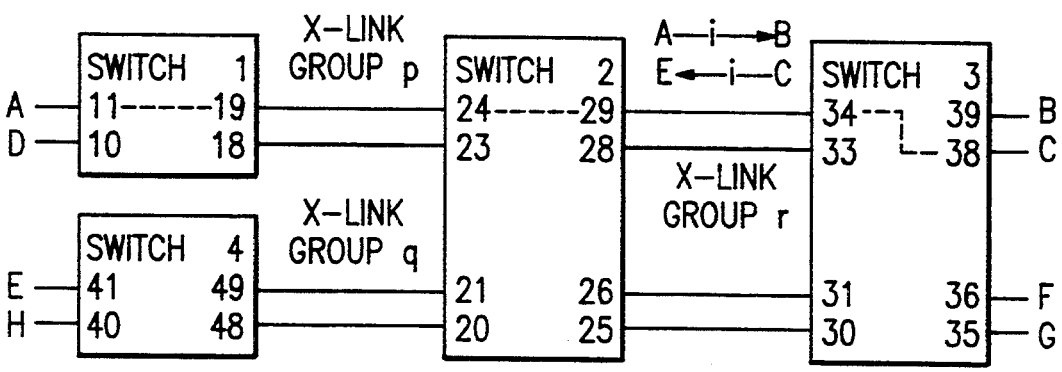
Figure 25:
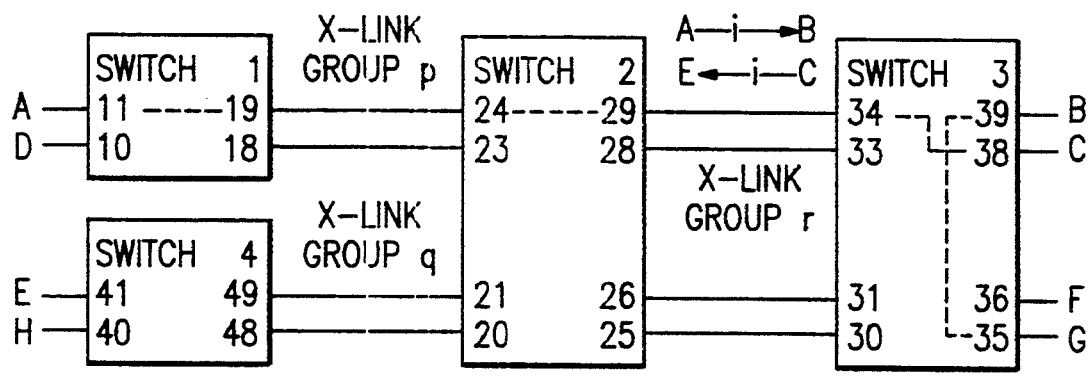
Figure 26:
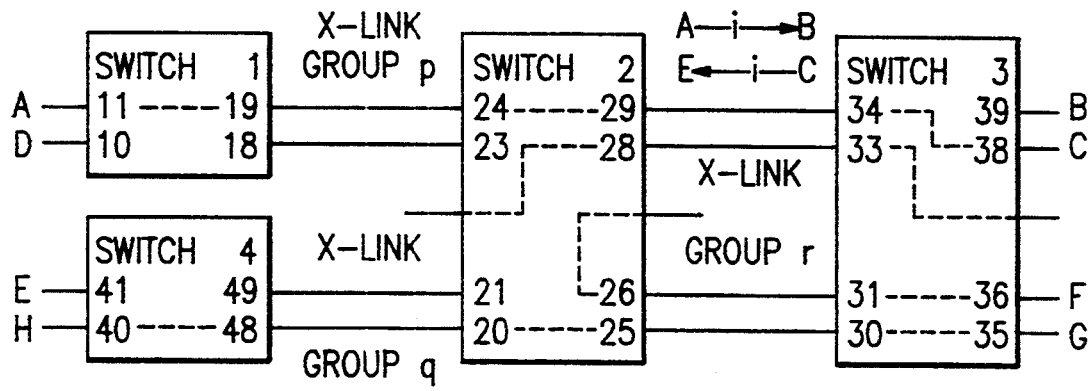

FIG. 5 shows A to B and B to A, where A<B or A>B
-Initiation Frames Passing on a Cross-Link-
FIG. 6 shows A to B and C to A, where A<C
-Initiation Frames Passing on a Cross-Link-
FIG. 7 shows A to B and C to A, where A>C; port 39 is inactive
-Initiation Frames Passing on a Cross-Link-
FIG. 8 shows A to B and C to A, where A>C; port 39 is connected
-Initiation Frames Passing on a Cross-Link-
FIG. 9 shows A to B and B to D, where A<B; idle X-Link in Group p
-Initiation Frames Passing on a Cross-Link-
FIG. 10 shows A to B and B to D, where A<B; no idle X-Link in Group
- Initiation Frames Passing on a Cross-Link-
FIG. 11 shows A to B and B to D, where A>B
-Initiation Frames Passing on a Cross-Link-
FIG. 12 shows A to B and C to D, where A<C; idle X-Link in Groups p and r
-Initiation Frames Passing on a Cross-Link-
FIG. 13 shows A to B and C to D, where A<C; no idle X-Link in Group r
-Initiation Frames Passing on a Cross-Link-
FIG. 14 shows A to B and C to D, where A<C; no idle X-Link in Group
-Initiation Frames Passing on a Cross-Link-
FIG. 15 shows A to B and C to D, where A>C; port 39 inactive
-Initiation Frames Passing on a Cross-Link-
FIG. 16 shows A to B and C to D, where A>C; port 39 is connected
-Initiation Frames Passing on a Cross-Link-
FIG. 17 shows A to B and C to D, where A>C; no idle X-Link in Group r
-Initiation Frames Passing on a Cross-Link-
FIG. 18 shows A to B and B to E, where A<B; idle X-Link in Group p
-Initiation Frames Passing on a Cross-Link-
FIG. 19 shows A to B and B to E, where A<B; no idle X-Link in Group q
-Initiation Frames Passing on a Cross-Link-
FIG. 20 shows A to B and B to E, where A>B
-Initiation Frames Passing on a Cross-Link-
FIG. 21 shows A to B and C to E, where A<C; idle X-Link in Groups p and q
-Initiation Frames Passing on a Cross-Link-
FIG. 22 shows A to B and C to E, where A<C; no idle X-Link in Group r
-Initiation Frames Passing on a Cross-Link-
FIG. 23 shows A to B and C to E, where A<C; no idle X-Link in Group q
-Initiation Frames Passing on a Cross-Link-
FIG. 24 shows A to B and C to E, where A>C; port 39 inactive
-Initiation Frames Passing on a Cross-Link-
FIG. 25 shows A to B and C to E, where A>C; port 39 is connected
-Initiation Frames Passing on a Cross-Link-
FIG. 26 shows A to B and C to E, where A>C; no idle X-Link in Group r
-Initiation Frames Passing on a Cross-Link- Our detailed description explains the preferred embodiments of our invention, together with advantages and features, by way of example with reference to the following drawings.

DETAILED DESCRIPTION OF THE INVENTION

Figure 1:
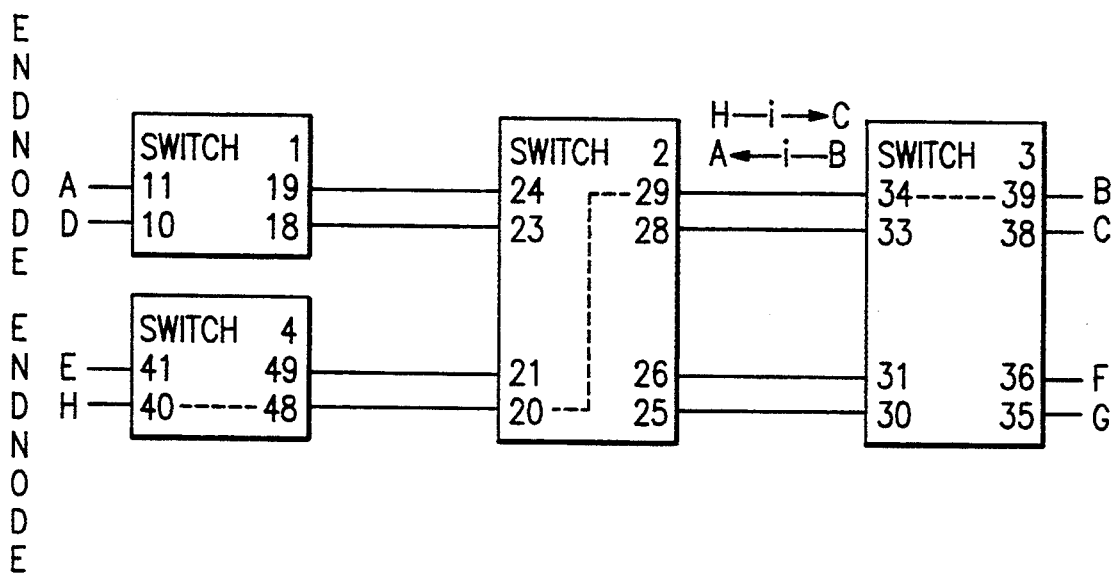
FIG. 1 shows schematically an overview of the preferred embodiment and particularly shows an example of Initiation Frames Passing on a Cross-Link between Switch 2, Pod 29 and Switch 3, Pod 34.

Before considering our preferred embodiments in detail, it may be worthwhile to illustrate, by way of example FIG. 1.

FIG. 1 illustrates a cascade of four switches which are also used by way of illustration in the subsequent FIGURES used to discuss initiation frames passing scenarios. As we have said, the attributes set forth above with reference to FIG. 1 apply to all FIGURES.

For purposes of illustration of our preferred embodiment illustrated by the FIGURES the circuit switches all can be coupled to an endpoint port of an endpoint node, shown for simplicity as ENDNODE in FIG. 1, where the upper ENDNODE has endpoint addresses A and D for the upper switch node, and the lower switch node has endpoint addresses E and H. The circuit switch has a memory and other logic circuits contained within the switch shown. The memory stores the port state of the circuit switch, and when a circuit is in a cross-link group, the memory stores the state of its cross-link group. Each link has normally two physical fibre optic lines forming a link, but one is possible, and a group can be one, two or three or more depending on the particular hardware involved. With respect to all circuit switches:

1. Each end-point port is assigned a single end-point address. It is understood, however, that an end-point port (non-ESCON) could be assigned multiple end-point addresses.

2. A given end-point address is assigned to no more than one end-point port within a dynamic switch cascade. It is understood, however, that it is possible to partition a dynamic switch cascade into multiple overlapping address domains such that a given end-point address may be assigned to more than one end-point port.

3. A given end-point address is associated with no more than one cross-link group attached to a dynamic switch node. It is understood, however, that it is possible to associate a given end-point address with two or more cross-link groups attached to a dynamic switch node. Such capability can increase the bandwidth between two individual dynamic switch nodes within a dynamic switch cascade by increasing the number of available communication links between two switch nodes.
4. A dynamic switch node may have a given end-point address associated with either an end-point switch port or with an attached cross-link group, but not both.
5. A cross-link group is defined as the collection (of all) cross-links between two individual switches. Although it is understood that the cross-links between two individual dynamic switches could be defined and grouped as two or more non-overlapping or overlapping cross-link groups, no practical advantage to such flexibility has been ascertained.
6. The following information is predefined to each dynamic switch node, although it is understood that this information could be acquired dynamically by the switch node.
   a. The port numbers of the end-point switch ports.
   b. The end-point address associated with each end-point switch port.
   c. The set of port numbers associated with each cross-link group.
   d. The set of end-point addresses associated with each cross-link group.

The Preferred Embodiment

Turning now to our invention in greater detail, it will be seen from FIG. 1 that in our preferred embodiment the following frame routing concepts are achieved. Frame routing may be accomplished via a destination address associated with either an end-point or with a set of ports to which a set of cross-links of a cross-link group is attached. Our invention allows a prioritized selection of an idle cross-link in a cross-link group. This maximizes the probability that any two initiation frames (which are used to create the dynamic connections) passing each other on the same cross-link group in opposite directions will pass each other on the same cross-link. As we have said, the system we describe provides a way of handling the initiation of two frames passing each other on the same cross-link to allow both connection requests to be satisfied. This satisfaction will be achieved when the resources are available and no other inhibiting conditions exist.

Maximizing the probability that two initiation frames passing in opposites directions utilizes the same cross-link of a cross-link group avoid the possibility of endless retrys and excessive utilization of switch ports and cross-links. By providing frame routing via a destination address as described, we provide for the following noted features.

1. Each end-point port is assigned a single end-point address. It is understood, however, that an end-point port (non-ESCON) could be assigned multiple end-point addresses.
2. A given end-point address is assigned to no more than one end-point port within a dynamic switch cascade. It is understood, however, that it is possible to partition a dynamic switch cascade into multiple overlapping address domains such that a given end-point address may be assigned to more than one end-point port.
3. A given end-point address is associated with no more than one cross-link group attached to a dynamic switch node. It is understood, however, that it is possible to associate a given end-point address with two or more cross-link groups attached to a dynamic switch node. Such capability can increase the bandwidth between two individual dynamic switch nodes within a dynamic switch cascade by increasing the number of available communication links between two switch nodes.
4. A dynamic switch node may have a given end-point address associated with either an end-point switch port or with an attached cross-link group, but not both.
5. A cross-link group is defined as the collection (of all) cross-links between two individual switches. Although it is understood that the cross-links between two individual dynamic switches could be defined and grouped as two or more non-overlapping or overlapping cross-link groups, no practical advantage to such flexibility has been ascertained.

Prioritized selection of an idle cross-link is achieved by a cross-link priority system wherein a value of the port number of an attached switch node is provided with the higher end-point address assigned to its switch internal port. Thus, the higher the port number, the higher the associated cross-link priority value. Both switch nodes attaches to a cross link group assign the same priorities to the participating cross links.

Cascade performance is optimized by minimizing the need for an initiating end-point node to retry initiation frame transmission. This is accomplished by assigning a relative priority between any two initiation frames passing each other on a cross-link. In accordance with our invention, an initiation frame containing a higher source end-point address is considered to be of higher priority.

Satisfying the connection requirements of a higher priority frame is attempted first. If no addressing conflicts or other inhibiting conditions (e.g. the destination is busy, no cross-links are available, etc.) exist, satisfying the connection requirements of the lower priority frame is attempted. The objective is to satisfy the connection requirements of both initiation frames without any need for a retry attempt by the initiating end-point node.

For instance, in the FIG. 1 example, since an idle cross-link is available between switches 2 and 3, the dynamic connection between switch ports 34 and 39 may be replaced by:
1. a dynamic connection between switch ports 34 and 38, allowing transmission of the H to C initiation frame to the end-point port assigned endpoint address C, and
2. a dynamic connection between switch ports 39 and 33, allowing retransmission of the B to A initiation frame via the new dynamic connection and subsequent reception of this frame by inactive switch port 28.

Initiation Frame Routing

As in the ESCON I/O Interface Architecture, if an end-point port has been assigned an end-point address and that end-point port is link attached to an end-point switch port of a dynamic switch node, the association of the assigned end-point address with the end-point switch port is known and maintained by the dynamic switch node. This association is used by the switch controller to route an initiation frame to the destination end-point address, as well as to perform address verification functions.

For each cross-link group that is known to a dynamic switch node, the set of cross-link port numbers associated with that cross-link group and the set of end-point addresses which are accessible via that cross-link group are known and maintained by the dynamic switch node. These associations are used by the switch controller to route an initiation frame to the switch node which contains the end-point switch port associated with the destination end-point address, as well as to perform address verification functions.

In FIG. 1, for example, three cross-link groups are known to Switch 2.

1. Cross-link port numbers 24 and 23 and end-point addresses A and D are associated with the cross-link group between Switch 2 and Switch 1.
2. Cross-link port numbers 21 and 20 and end-point addresses E and H are associated with the cross-link group between Switch 2 and Switch 4.
3. Cross-link port numbers 29, 28, 26, and 25 and end-point addresses B, C, F, and G are associated with the cross-link group between Switch 2 and Switch 3.

If a dynamic switch port in the inactive state receives an initiation frame with a destination end-point address associated with an end-point switch port in the inactive state and no other inhibiting conditions exist, then a dynamic connection is established between these two ports and the initiation frame is passed through the dynamic connection. If the end-point switch port associated with the destination address is in other than the inactive state or if another inhibiting condition exists, e.g., communication between the source and destination end-point addresses is prohibited or an address specification error is detected, then a busy or reject response frame, as appropriate, is returned to the end-point port that originated transmission of the initiation frame. Busy and reject responses are both disconnect-frames, such that either of these response frames will cause removal of any existing monolog connections on the return path to the originating end-point port.

Similarly, if a dynamic switch port in the inactive state receives an initiation frame with a destination end-point address associated with a cross-link group and at least one cross-link switch port associated with that cross-link group is in the inactive state and no other inhibiting conditions exist, then a dynamic connection is established between the switch port that received the initiation frame from the link and a selected cross-link switch port in the inactive state that is associated with the desired cross-link group and the initiation frame is passed through the dynamic connection. If none of the cross-link ports associated with the desired cross-link group are in the inactive state or if another inhibiting condition exists, then a busy or reject response frame, as appropriate, is returned to the end-point port that originated transmission of the initiation frame.

Cross-Link Selection

When a dynamic switch port in the inactive state receives an initiation frame with a destination end-point address associated with a cross-link group and at least one cross-link switch port associated with that cross-link group is in the inactive state and no other inhibiting conditions exist, then a dynamic connection is established between the switch port that received the initiation frame from the link and a selected inactive cross-link switch port associated with the desired cross-link group.

The switching controller searches for the first inactive cross-link port associated with the desired cross-link group using a cross-link port priority algorithm. This algorithm allows each of the two switch nodes that are interconnected by a cross-link group to have a common view of the prioritization of cross-links within a cross-link group. In particular, if the switching controllers of the two switch nodes are each simultaneously attempting to create a dynamic connection to a cross-link switch port in the same cross-link group and if each switch node's view of the available idle cross-links is the same at this point in time, i.e., if a cross-link switch port at one end of a cross-link is in the inactive state, then the cross-link switch port at the other end of that cross-link is also in the inactive state, then each switching controller will create a dynamic connection to a cross-link port associated with the same cross-link within the cross-link group. This cross-link selection algorithm is designed to maximize the probability that any two initiation frames passing each other in a cross-link group in opposite directions will pass each other on the same cross-link.

Although the assignment of priorities to cross-links within a cross-link group could be accomplished by any of several means, this disclosure proposes the use of the following approach in an ESCON environment or an analogous approach in any other similar type of environment. An exchange of node identifiers by a node and its neighboring node is performed on each attached link. The node identifier information returned allows identification of a neighboring switch node that supports the dynamic cascading function, the endpoint address assigned to the switch internal port of the neighboring switch node, and the switch port number of the neighboring node's switch port associated with the cross-link used for the node identifier exchange. When two dynamic switch nodes which support dynamic switch cascading are interconnected by a set of cross-links comprising a cross-link group, the switch node that has the higher end-point address assigned to its switch internal port assigns cross-link priorities based on the port number values of the ports to which those cross-links are attached. In particular, the higher the port number, the higher the associated cross-link priority. The switch node that has the lower end-point address assigned to its switch internal port assigns cross-link priorities based on the port number values of the neighboring node's switch ports so as to achieve a common cross-link priority assignment by each of the two switch nodes.

If a different cross-link selection algorithm was used, then scenarios in which initiation frames pass each other on separate cross-links of the same cross-link group would occur much more frequently. This would make it extremely difficult to create a design which would achieve the goals cited in the preceding Objectives section. Some implications of initiation frames passing on separate cross-links of a cross-link group are demonstrated by the following examples.

In FIG. 2, the A to B and B to A initiation frames are shown passing each other on separate cross-links of the same cross-link group. The B to A initiation frame may result in the establishment of a dynamic connection between switch ports 29 and 23. When the B to A initiation frame is received at switch port 18, switch port 11 will appear busy if it is still connected to switch port 19, and a busy response frame will be returned to the endpoint port that originated transmission of the B to A initiation frame. Meanwhile, when the A to B initiation frame is received at switch port 30, switch port 39 will appear busy as a result of its connection to switch port 34, causing a busy response frame to be returned to the end-point port that originated transmission of the A to B initiation frame. This scenario has the potential of producing endless retrys.

Based on the protocols defined by this disclosure, if the A to B and B to A frames were to pass each other on the same cross-link, a dialog-2 connection would be established in each switch in the path between the end-point ports assigned end-point addresses A and B, thereby relegating responsibility for prioritization of these two initiation frames, if appropriate, to the affected endpoint nodes.

In FIG. 3, the A to B and C to A initiation frames are shown passing each other on separate cross-links of the same cross-link group. The A to B initiation frame will result in the establishment of a dynamic connection between switch ports 30 and 39. The C to A initiation frame will result in the establishment of a dynamic connection between switch ports 29 and 23. When the C to A initiation frame is received at switch port 18, switch port 11 will appear busy, since it is connected to switch port 19, and a busy response frame will be returned to the end-point port that originated transmission of the C to A initiation frame. This scenario unnecessarily increases the utilization of switch ports and cross-links, before a busy response is returned to the to the origin of the C to A initiation frame.

Based on the protocols defined by this disclosure, if the A to B and C to A initiation frames were to pass each other on the same cross-link, the cross-link switch ports at each end of the cross-link together with the switching controller of the respective switch nodes would perform the following functions atomically.

1. Determine that both initiation frames can not be satisfied simultaneously, based on the destination and source end-point addresses specified by the two initiation frames.
2. Determine the priority relationship between the two initiation frames.
3. Cause a busy response to be sent the end-point port that originated the transmission of the lower priority frame and remove the related dynamic connection(s).
4. Fulfill the dynamic connection and transmission requirements of the higher priority initiation frame.

In FIG. 4, the A to B and C to D initiation frames are shown passing each other on separate cross-links of the same cross-link group. The A to B initiation frame will result in the establishment of a dynamic connection between switch ports 30 and 39. The C to D initiation frame will result in the establishment of dynamic connections between switch ports 29 and 23 and between switch ports 18 and 10. The dynamic connection requirements of each of the initiation frames is satisfied with no special handling of initiation frames passing on a cross-link required.

Based on the protocols defined by this disclosure, if the A to B and C to D initiation frames were to pass each other on the same cross-link, the cross-link switch ports at each end of the cross-link together with the switching controller of the respective switch nodes would cause the following functions to be performed as an atomic operation.

1. Determine that both initiation frames can be satisfied simultaneously, based on the destination and source end-point addresses specified by the two initiation frames.
2. Determine the priority relationship between the two initiation frames.
3. Fulfill the dynamic connection and transmission requirements of the higher priority initiation frame.
4. Fulfill the dynamic connection and transmission requirements of the lower priority initiation frame.

The dynamic connection requirements of each of the initiation frames is satisfied. Although the handling of initiation frames passing on a cross-link increases the connection time, this atomic operation should have a negligible performance impact.

Initiation Frames Passing on a Cross-Link

The protocols used to resolve the handling of initiation frames passing on a cross-link are discussed in more detail in this section using a series of examples to illustrate the actions taken by the affected switch nodes.

In examples which do not result in a dialog-2 connection, the relative priority between the two initiation frames is used to determine the appropriate actions to be taken by each switch node. Although various means of establishing such a priority are possible, this disclosure bases the relative priority on the values of the source end-point addresses contained in the two initiation frames. In particular, the initiation frame containing the higher source end-point address is considered to be of higher priority than the initiation frame with a source end-point address of lower value.

When a switch port enters the monolog-source (MS) state, a duplicate of the initiation frame is maintained by that port until a dialog state is entered or certain other conditions cause the saved initiation frame to be discarded. This allows a MS port to tolerate the removal of its dynamic connection and when reconnected to again enter the MS state by passing the saved initiation frame to the connected switch port. This capability is used to allow accommodation of the connection requirements of both the higher and lower priority initiation frames which pass each other on a cross-link when no other inhibiting conditions are present.

The procedures outlined in the following examples reflect a generalized procedure structure designed to satisfy the objectives of this invention. Each of the affected dynamic switch nodes performs the applicable actions defined by this procedure as an atomic operation, i.e., no other dynamic connections are established or removed until these actions are completed. The major steps of this generalized procedure are listed below.

1. The affected dynamic switch nodes determine whether conditions for a dialog-2 connection exist.
2. If dialog-2 conditions exist, each switch node passes the initiation frame received from the link through the existing dynamic connection. No further action is required.
3. If dialog-2 conditions do not exist, each switch node determines the relative priority of the two initiation frames.
4. The switch node that has established a dynamic connection on behalf of the higher priority initiation frame discards the lower priority frame received from the link without any further action or change of port states.

5. The switch node that has established a dynamic connection on behalf of the lower priority initiation frame determines the viability of accommodating the dynamic connection requirement of the higher priority initiation frame, if the existing dynamic connection on behalf of the lower priority frame were removed.

Accommodation of the dynamic connection requirement of the higher priority initiation frame is considered NOT VIABLE if one of the following conditions is applicable or another inhibiting condition exists.
   a. The destination end-point address of the higher priority initiation frame is associated with an end-point switch port that is in other than the inactive state AND the destination end-point address of the higher priority initiation frame is NOT equal to the source end-point address of the lower priority initiation frame.
   b. The destination end-point address of the higher priority initiation frame is associated with a cross-link group that has no idle cross-link AND the destination end-point address of the higher priority initiation frame and the source end-point address of the lower priority initiation frame are NOT both associated with the same cross-link group.

Conversely, accommodation of the dynamic connection requirement of the higher priority initiation frame is considered VIABLE if one of the following conditions is applicable and no other inhibiting condition exists.
   a. The destination end-point address of the higher priority initiation frame is associated with an end-point switch port that is in the inactive state.
   b. The destination end-point address of the higher priority initiation frame is associated with a cross-link group that has an idle cross-link.
   c. The destination end-point address of the higher priority initiation frame is equal to the source end-point address of the lower priority initiation frame.
   d. The destination end-point address of the higher priority initiation frame and the source end-point address of the lower priority initiation frame are both associated with the same cross-link group.

6. If accommodation of the dynamic connection requirement of the higher priority initiation frame is considered NOT VIABLE, the following actions are performed.
   a. The existing dynamic connection on behalf of the lower priority frame is removed.
   b. The cross-link switch port that received the higher priority initiation frame from the link is caused to send the appropriate busy or reject response frame and enter the inactive state.
   c. The switch port that had served as the MS port for the dynamic connection on behalf of the lower priority initiation frame is connected to the "appropriate cross-link switch port" of the cross-link group with which the destination end-point address is associated and the saved initiation frame is passed through the dynamic connection.
      1) If the destination end-point address of the lower priority initiation frame is equal to the source end-point address of the higher priority initiation frame, the "appropriate cross-link switch port" is the switch port that sent the busy or reject response frame. This assures that the switch node at the other end of the cross-link group will receive and handle the busy or reject response to the higher priority initiation frame before it receives and handles the lower priority initiation frame.
      2) If the destination end-point address of the lower priority initiation frame is NOT equal to the source end-point address of the higher priority initiation frame, the "appropriate cross-link switch port" is the switch port associated with the highest priority idle cross-link.

Alternatively, the following actions may be taken to accomplish this step, if performance or other design considerations indicate an advantage to this approach. This alternative is considered less desirable, since a higher priority idle cross-link than that used when the initial connection for the lower priority initiation frame was established may now be available. Therefore, this alternative is not reflected in subsequent procedure examples.
   a. The cross-link switch port that received the higher priority initiation frame from the link is caused to send the appropriate busy or reject response frame.
   b. The switch port (in the MS state) that received the lower priority initiation frame from the link is notified to retransmit the lower priority initiation frame through the existing dynamic connection to the cross-link switch port (in the MD state). No further action or change of port state takes place.

7. If accommodation of the dynamic connection requirement of the higher priority initiation frame is considered VIABLE, then the following actions are performed.
   a. The existing dynamic connection on behalf of the lower priority frame is removed.
   b. If the dynamic connection required by the higher priority initiation frame is in conflict with the connection requirements of the lower priority initiation frame, for example, due to addressing conflicts or lack of an available idle cross-link, then the switch port that had served as the MS port for the dynamic connection on behalf of the lower priority initiation frame is caused to discard the saved initiation frame, send a busy response frame on its attached link, and enter the inactive state.
   c. A dynamic connection on behalf of the higher priority initiation frame is established and the initiation frame is passed through the dynamic connection.
      1) If the destination end-point address of the higher priority initiation frame is equal to the source end-point address of the lower priority initiation frame, the dynamic connection is established between the cross-link switch port that received the higher priority initiation frame from the link and the switch port that sent the busy response to the lower priority initiation frame. If the latter port is a cross-link switch port, this assures that the switch node at the other end of the cross-link group will receive and handle the busy or reject response to the lower priority initiation frame before it receives and handles the higher priority initiation frame.

2) If the destination end-point address of the higher priority initiation frame is NOT equal to the source end-point address of the lower priority initiation frame, the dynamic connection is established between the cross-link switch port that received the higher priority initiation frame from the link and either an end-point switch port or a cross-link switch port associated with the highest priority idle cross-link of a cross-link group, as determined by the destination end-point address.

d. If the dynamic connection required by the higher priority initiation frame is not in conflict with the connection requirements of the lower priority initiation frame and no other inhibiting conditions exist, the switch port that had served as the MS port for the dynamic connection on behalf of the lower priority initiation frame is connected to the cross-link switch port associated with the highest priority idle cross-link link of the cross-link group with which the destination end-point address is associated and the saved initiation frame is passed through the dynamic connection.

e. If the dynamic connection required by the higher priority initiation frame is not in conflict with the connection requirements of the lower priority initiation frame, but another inhibiting condition precludes the establishment of a new dynamic connection for the lower priority initiation frame, the switch port that had served as the MS port for the dynamic connection on behalf of the lower priority initiation frame is caused to discard the saved initiation frame, send a busy response frame on its attached link, and enter the inactive state.

Although the preceding generalized procedure and the procedure examples that follow are each described as a series of sequential steps, the intent is to describe a set of actions which, when applied to a variety of conditions, produce the desired results. The design of a dynamic switch node is expected to optimize the performance of these actions by modifying, as appropriate, the ordering, the nature, and, in particular, the degree of parallelism of these actions without affecting the intent or integrity of these procedures. For example, the switch node that has established a dynamic connection on behalf of the lower priority frame can remove that dynamic connection prior to, or in parallel with, determining the viability of the connection requirements of the higher priority frame.

The terms below are used for brevity in the following procedure descriptions

1. Switch refers to a dynamic switch node.
2. X-Link refers to a cross-link.
3. SRC M and DST N refers to the source and destination end-point addresses M and N, respectively.

Procedure—FIG. 5

1. Switches 2 and 3 each determine that conditions for a dialog-2 connection exist.
2. Port 29 passes the received B to A initiation frame through the existing dynamic connection and enters the dialog-2 state.
3. Port 34 passes the received A to B initiation frame through the existing dynamic connection and enters the dialog-2 state.
4. X-Link port 19 is also in the MD state when the B to A initiation frame is received from the link and handled in the same manner.

Procedure—FIG. 6

1. Switches 2 and 3 each determine that conditions for a dialog-2 connection do not exist.
2. Since SRC C>SRC A, Switches 2 and 3 each determine that the C to A frame has priority over the A to B frame.
3. Switch 3 discards the lower priority A to B frame.
4. Switch 2 performs the following actions.
    a. A dynamic connection for the higher priority initiation frame is determined VIABLE.
    b. Since DST A of the higher priority frame equals SRC A of the lower priority frame, it determines that both initiation frames can not be satisfied simultaneously and the initiation frame to DST A should follow a disconnect frame to DST A using the same link.
    c. The connection between port 24 and port 29 is removed.
    d. Port 24 is caused to send a busy (disconnect) response frame on the attached link and discard the saved A to B frame.
    e. A new connection is established between port 29 and port 24.
    f. The C to A frame is passed through the dynamic connection by port 29 (MS state) to port 24 (MD state).

Procedure—FIG. 7

1. Switches 2 and 3 each determine that conditions for a dialog-2 connection do not exist.
2. Since SRC A>SRC C, Switches 2 and 3 each determine that the A to B frame has priority over the C to A frame.
3. Switch 2 discards the lower priority C to A frame.
4. Switch 3 performs the following actions.
    a. A dynamic connection for the higher priority initiation frame is determined VIABLE.
    b. Since SRC A of the higher priority frame equals DST A of the lower priority frame, it determines that both initiation frames can not be satisfied simultaneously.
    c. The connection between port 38 and port 34 is removed.
    d. Port 38 is caused to send a busy (disconnect) response frame on the attached link and discard the saved C to A frame.
    e. A new connection is established between port 34 and port 39.
    f. The A to B frame is passed through the dynamic connection by port 34 (MS state) to port 39 (MD state).

Procedure—FIG. 8

1. Switches 2 and 3 each determine that conditions for a dialog-2 connection do not exist.
2. Since SRC A>SRC C, Switches 2 and 3 each determine that the A to B frame has priority over the C to A frame.
3. Switch 2 discards the lower priority C to A frame.
4. Switch 3 performs the following actions.
    a. A dynamic connection for the higher priority initiation frame is determined NOT VIABLE.
    b. Since DST A of the lower priority frame equals SRC A of the higher priority frame, it determines that both initiation frames can not be satisfied simultaneously and the initiation frame to DST A should follow a disconnect frame to DST A using the same link.

c. The connection between port 38 and port 34 is removed.

d. Port 34 is caused to send a busy (disconnect) response frame on the attached link and discard the saved A to B frame.

e. A new connection is established between port 38 and port 34.

f. The saved C to A frame is passed through the dynamic connection by port 38 (MS state) to port 34 (MD state).

Procedure—FIG. 9

1. Switches 2 and 3 each determine that conditions for a dialog-2 connection do not exist.
2. Since SRC B>SRC A, Switches 2 and 3 each determine that the B to D frame has priority over the A to B frame.
3. Switch 3 discards the A to B frame.
4. Switch 2 performs the following actions.
   a. A dynamic connection for the higher priority initiation frame is determined VIABLE.
   b. Since SRC B of the higher priority frame equals DST B of the lower priority frame, it determines that both initiation frames can not be satisfied simultaneously.
   c. The connection between port 23 and port 28 is removed.
   d. Pod 23 is caused to send a busy (disconnect) response frame on the attached link and discard the saved A to B frame.
   e. A new connection is established between port 28 and port 24, i.e., the X-Link port associated with the highest priority idle X-Link in X-Link group p.
   f. The B to D frame is passed through the dynamic connection by port 28 (MS state) to port 24 (MD state).

Procedure—FIG. 10

1. Switches 2 and 3 each determine that conditions for a dialog-2 connection do not exist.
2. Since SRC B>SRC A, Switches 2 and 3 each determine that the B to D frame has priority over the A to B frame.
3. Switch 3 discards the A to B frame.
4. Switch 2 performs the following actions.
   a. A dynamic connection for the higher priority initiation frame is determined VIABLE.
   b. Since SRC B of the higher priority frame equals DST B of the lower priority frame, it determines that both initiation frames can not be satisfied simultaneously.
   c. The connection between port 23 and port 28 is removed.
   d. Pod 23 is caused to send a busy (disconnect) response frame on the attached link and discard the saved A to B frame.
   e. A new connection is established between port 28 and port 23, i.e., the X-Link port associated with the highest priority (and only) idle X-Link in X-Link group p.
   f. The B to D frame is passed through the dynamic connection by port 28 (MS state) to port 23 (MD state).

Procedure—FIG. 11

1. Switches 2 and 3 each determine that conditions for a dialog-2 connection do not exist.
2. Since SRC A>SRC B, Switches 2 and 3 each determine that the A to B frame has priority over the B to D frame.
3. Switch 2 discards the lower priority B to D frame.
4. Switch 3 performs the following actions.
   a. A dynamic connection for the higher priority initiation frame is determined VIABLE.
   b. Since DST B of the higher priority frame equals SRC B of the lower priority frame, it determines that both initiation frames can not be satisfied simultaneously and the initiation frame to DST B should follow a disconnect frame to DST B using the same link.
   c. The connection between port 39 and port 34 is removed.
   d. Port 39 is caused to send a busy (disconnect) response frame on the attached link and discard the saved B to D frame.
   e. A new connection is established between port 34 and port 39.
   f. The A to B frame is passed through the dynamic connection by port 34 (MS state) to port 39 (MD state).

Procedure—FIG. 12

1. Switches 2 and 3 each determine that conditions for a dialog-2 connection do not exist.
2. Since SRC C>SRC A, Switches 2 and 3 each determine that the C to D frame has priority over the A to B frame.
3. Switch 3 discards the A to B frame.
4. Switch 2 performs the following actions.
   a. A dynamic connection for the higher priority initiation frame is determined VIABLE.
   b. The connection between port 24 and port 29 is removed.
   c. A new connection is established between port 29 and port 23, i.e., the X-Link port associated with the highest priority idle (and only) X-Link in X-Link group p.
   d. The C to D frame is passed through the dynamic connection by port 29 (MS state) to port 23 (MD state).
   e. A new connection is established between port 24 and port 28, i.e., the X-Link port associated with the highest priority idle X-Link in X-Link group r.
   f. The saved A to B frame is passed through the dynamic connection by port 24 (MS state) to port 28 (MD state).

Procedure—FIG. 13

1. Switches 2 and 3 each determine that conditions for a dialog-2 connection do not exist.
2. Since SRC C>SRC A, Switches 2 and 3 each determine that the C to D frame has priority over the A to B frame.
3. Switch 3 discards the A to B frame.
4. Switch 2 performs the following actions.
   a. A dynamic connection for the higher priority initiation frame is determined VIABLE.
   b. The connection between port 24 and port 29 is removed.
   c. A new connection is established between port 29 and port 23, i.e., the X-Link port associated with the highest priority (and only) idle X-Link in X-Link group p.
   d. The C to D frame is passed through the dynamic connection by port 29 (MS state) to port 23 (MD state).

e. Since there is no idle X-Link in X-Link group r to accommodate a dynamic connection for the A to B initiation frame, port 24 is caused to send a busy (disconnect) response frame on the attached link and discard the saved A to B frame.

Procedure—FIG. 14

1. Switches 2 and 3 each determine that conditions for a dialog-2 connection do not exist.
2. Since SRC C>SRC A, Switches 2 and 3 each determine that the C to D frame has priority over the A to B frame.
3. Switch 3 discards the A to B frame.
4. Switch 2 performs the following actions.
   a. A dynamic connection for the higher priority initiation frame is determined VIABLE.
   b. Since DST D and SRC A are both associated with X-Link group p and there are no idle X-Links in X-Link group p, it determines that both initiation frames can not be satisfied simultaneously.
   c. The connection between port 24 and port 29 is removed.
   d. Pod 24 is caused to send a busy (disconnect) response frame on the attached link and discard the saved A to B frame.
   e. A new connection is established between port 29 and port 24, i.e., the X-Link port associated with the highest priority (and only) idle X-Link in X-Link group p.
   f. The C to D frame is passed through the dynamic connection by port 29 (MS state) to port 24 (MD state).

Procedure—FIG. 15

1. Switches 2 and 3 each determine that conditions for a dialog-2 connection do not exist.
2. Since SRC A>SRC C, Switches 2 and 3 each determine that the A to B frame has priority over the C to D frame.
3. Switch 2 discards the C to D frame.
4. Switch 3 performs the following actions.
   a. A dynamic connection for the higher priority initiation frame is determined VIABLE.
   b. The connection between port 38 and port 34 is removed.
   c. A new connection is established between port 34 and port 39.
   d. The A to B frame is passed through the dynamic connection by port 34 (MS state) to port 39 (MD state).
   e. A new connection is established between port 38 and port 33, i.e., the X-Link port associated with the highest priority idle X-Link in X-Link group r.
   f. The saved C to D frame is passed through the dynamic connection by port 38 (MS state) to port 33 (MD state).

Procedure—FIG. 16

1. Switches 2 and 3 each determine that conditions for a dialog-2 connection do not exist.
2. Since SRC A>SRC C, Switches 2 and 3 each determine that the A to B frame has priority over the C to D frame.
3. Switch 2 discards the lower priority C to D frame.
4. Switch 3 performs the following actions.
   a. A dynamic connection for the higher priority initiation frame is determined NOT VIABLE.
   b. The connection between port 38 and port 34 is removed.
   c. Pod 34 is caused to send a busy (disconnect) response frame on the attached link.
   d. A new connection is established between port 38 and port 34, i.e., the X-Link port associated with the highest priority idle X-Link in X-Link group r.
   e. The saved C to D frame is passed through the dynamic connection by port 38 (MS state) to port 34 (MD state).

Procedure—FIG. 17

1. Switches 2 and 3 each determine that conditions for a dialog-2 connection do not exist.
2. Since SRC A>SRC C, Switches 2 and 3 each determine that the A to B frame has priority over the C to D frame.
3. Switch 2 discards the C to D frame.
4. Switch 3 performs the following actions.
   a. A dynamic connection for the higher priority initiation frame is determined VIABLE.
   b. The connection between port 38 and port 34 is removed.
   c. A new connection is established between port 34 and port 39.
   d. The A to B frame is passed through the dynamic connection by port 34 (MS state) to port 39 (MD state).
   e. Since there is no idle X-Link in X-Link group r to accommodate a dynamic connection for the C to D initiation frame, port 38 is caused to send a busy (disconnect) response frame on the attached link and discard the saved C to D frame.

Procedure—FIG. 18

1. Switches 2 and 3 each determine that conditions for a dialog-2 connection do not exist.
2. Since SRC B>SRC A, Switches 2 and 3 each determine that the B to E frame has priority over the A to B frame.
3. Switch 3 discards the A to B frame.
4. Switch 2 performs the following actions.
   a. A dynamic connection for the higher priority initiation frame is determined VIABLE.
   b. Since SRC B of the higher priority frame equals DST B of the lower priority frame, it determines that both initiation frames can not be satisfied simultaneously.
   c. The connection between port 23 and port 28 is removed.
   d. Pod 23 is caused to send a busy (disconnect) response frame on the attached link and discard the saved A to B frame.
   e. A new connection is established between port 28 and port 21, i.e., the X-Link port associated with the highest priority idle X-Link in X-Link group q.
   f. The B to E frame is passed through the dynamic connection by port 28 (MS state) to port 21 (MD state).

Procedure—FIG. 19

1. Switches 2 and 3 each determine that conditions for a dialog-2 connection do not exist.
2. Since SRC B>SRC A, Switches 2 and 3 each determine that the B to E frame has priority over the A to B frame.
3. Switch 3 discards the A to B frame.
4. Switch 2 performs the following actions.
   a. A dynamic connection for the higher priority initiation frame is determined NOT VIABLE.

b. Since DST B of the lower priority frame equals SRC B of the higher priority frame, it determines that both initiation frames can not be satisfied simultaneously and the initiation frame to DST B should follow a disconnect frame to DST B using the same link.
c. The connection between port 23 and port 28 is removed.
d. Pod 28 is caused to send a busy (disconnect) response frame on the attached link.
e. A new connection is established between port 23 and port 28.
f. The saved A to B frame is passed through the dynamic connection by port 23 (MS state) to port 28 (MD state).

Procedure—FIG. 20
1. Switches 2 and 3 each determine that conditions for a dialog-2 connection do not exist.
2. Since SRC A>SRC B, Switches 2 and 3 each determine that the A to B frame has priority over the B to E frame.
3. Switch 2 discards the lower priority B to E frame.
4. Switch 3 performs the following actions.
   a. A dynamic connection for the higher priority initiation frame is determined VIABLE.
   b. Since DST B of the higher priority frame equals SRC B of the lower priority frame, it determines that both initiation frames can not be satisfied simultaneously and the initiation frame to DST B should follow a disconnect frame to DST B using the same link.
   c. The connection between port 39 and port 34 is removed.
   d. Port 39 is caused to send a busy (disconnect) response frame on the attached link and discard the saved B to E frame.
   e. A new connection is established between port 34 and port 39.
   f. The A to B frame is passed through the dynamic connection by port 34 (MS state) to port 39 (MD state).

Procedure—FIG. 21
1. Switches 2 and 3 each determine that conditions for a dialog-2 connection do not exist.
2. Since SRC C>SRC A, Switches 2 and 3 each determine that the C to E frame has priority over the A to B frame.
3. Switch 3 discards the A to B frame.
4. Switch 2 performs the following actions.
   a. A dynamic connection for the higher priority initiation frame is determined VIABLE.
   b. The connection between port 24 and port 29 is removed.
   c. A new connection is established between port 29 and port 21, i.e., the X-Link port associated with the highest priority idle X-Link in X-Link group q.
   d. The C to E frame is passed through the dynamic connection by port 29 (MS state) to port 21 (MD state).
   e. A new connection is established between port 24 and port 28, i.e., the X-Link port associated with the highest priority idle X-Link in X-Link group r.
   f. The saved A to B frame is passed through the dynamic connection by port 24 (MS state) to port 28 (MD state).

Procedure—FIG. 22
1. Switches 2 and 3 each determine that conditions for a dialog-2 connection do not exist.
2. Since SRC C>SRC A, Switches 2 and 3 each determine that the C to E frame has priority over the A to B frame.
3. Switch 3 discards the A to B frame.
4. Switch 2 performs the following actions.
   a. A dynamic connection for the higher priority initiation frame is determined VIABLE.
   b. The connection between port 24 and port 29 is removed.
   c. A new connection is established between port 29 and port 21, i.e., the X-Link port associated with the highest priority (and only)idle X-Link in X-Link group q.
   d. The C to E frame is passed through the dynamic connection by port 29 (MS state) to port 21 (MD state).
   e. Since there is no idle X-Link in X-Link group r to accommodate a dynamic connection for the A to B initiation frame, port 24 is caused to send a busy (disconnect) response frame on the attached link and discard the saved A to B frame.

Procedure—FIG. 23
1. Switches 2 and 3 each determine that conditions for a dialog-2 connection do not exist.
2. Since SRC C>SRC A, Switches 2 and 3 each determine that the C to E frame has priority over the A to B frame.
3. Switch 3 discards the A to B frame.
4. Switch 2 performs the following actions.
   a. A dynamic connection for the higher priority initiation frame is determined NOT VIABLE.
   b. The connection between port 24 and port 29 is removed.
   c. Port 29 is caused to send a busy (disconnect) response frame on the attached link.
   d. A new connection is established between port 24 and port 29, i.e., the X-Link port associated with the highest priority idle X-Link in X-Link group r.
   e. The saved A to B frame is passed through the dynamic connection by port 24 (MS state) to port 29 (MD state).

Procedure—FIG. 24
1. Switches 2 and 3 each determine that conditions for a dialog-2 connection do not exist.
2. Since SRC A>SRC C, Switches 2 and 3 each determine that the A to B frame has priority over the C to E frame.
3. Switch 2 discards the C to E frame.
4. Switch 3 performs the following actions.
   a. A dynamic connection for the higher priority initiation frame is determined VIABLE.
   b. The connection between port 38 and port 34 is removed.
   c. A new connection is established between port 34 and port 39.
   d. The A to B frame is passed through the dynamic connection by port 34 (MS state) to port 39 (MD state).
   e. A new connection is established between port 38 and port 33, i.e., the X-Link port associated with the highest priority idle X-Link in X-Link group r.
   f. The saved C to E frame is passed through the dynamic connection by port 38 (MS state) to port 33 (MD state).

Procedure—FIG. 25
1. Switches 2 and 3 each determine that conditions for a dialog-2 connection do not exist.
2. Since SRC A>SRC C, Switches 2 and 3 each determine that the A to B frame has priority over the C to E frame.
3. Switch 2 discards the lower priority C to E frame.
4. Switch 3 performs the following actions.
   a. A dynamic connection for the higher priority initiation frame is determined NOT VIABLE.
   b. The connection between port 38 and port 34 is removed.
   c. Port 34 is caused to send a busy (disconnect) response frame on the attached link.
   d. A new connection is established between port 38 and port 34, i.e., the X-Link port associated with the highest priority idle X-Link in X-Link group r.
   e. The saved C to E frame is passed through the dynamic connection by port 38 (MS state) to port 34 (MD state).

Procedure—FIG. 26
1. Switches 2 and 3 each determine that conditions for a dialog-2 connection do not exist.
2. Since SRC A>SRC C, Switches 2 and 3 each determine that the A to B frame has priority over the C to E frame.
3. Switch 2 discards the C to E frame.
4. Switch 3 performs the following actions.
   a. A dynamic connection for the higher priority initiation frame is determined VIABLE.
   b. The connection between port 38 and port 34 is removed.
   c. A new connection is established between port 34 and port 39.
   d. The A to B frame is passed through the dynamic connection by port 34 (MS state) to port 39 (MD state).
   e. Since there is no idle X-Link in X-Link group r to accommodate a dynamic connection for the C to E initiation frame, port 38 is caused to send a busy (disconnect) response frame on the attached link and discard the saved C to E frame.

Industrial Applications

This problem has not been solved before for dynamic circuit switch connections, as applicable to dynamic switch cascade operation, is compatible with the ESCON I/O Interface Architecture (ref. 1) or to a fabric node supporting the Class 1 service defined by the Fibre Channel ANSI Standard (ref. 4). Our invention provides a solution to the problem of making such dynamic switch connections for any computer environment which is compatible with the Fibre Channel ANSI Standard.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:
1. A computer interconnection system comprising:
    a plurality of circuit switches having circuit switch ports coupled by a dynamic connection to provide a dynamically cascadable switching network;
    said dynamically cascadable switching network having a plurality of nodes, including end point and switch nodes,
    said circuit switches being located in the network between the end point nodes of the network,
    two individual circuit switches of said circuit switches of the network being interconnected by a cross-link group of one or more links,
    said system having transmission means for transmitting frame information including a source endpoint address and a destination endpoint address, each of which can be associated with an endpoint port or a cross-link group, and
    means for dynamically forming a connection between an endpoint port or a cross-link group to make a connection between a circuit switch port corresponding to said source endpoint address and a circuit switch port corresponding to said destination endpoint.

2. A computer interconnection system according to claim 1 wherein a circuit switch is provided with memory means for storing its port state, and when the circuit switch is in a cross-link group, the state of its cross-link group.

3. A computer interconnection system according to claim 1 wherein in the system each switch port is assigned an end-point address.

4. A computer interconnection system according to claim 1 wherein a given end-point address is assigned to no more than one end-point port within a dynamic switch cascade.

5. A computer interconnection system according to claim 1 wherein a given end-point address is associated with no more than one cross-link group attached to a dynamic switch node.

6. A computer interconnection system according to claim 1 wherein a given end-point address is associated with two or more cross-link groups attached to a dynamic switch node to increase the bandwidth between two individual dynamic switch nodes within a dynamic switch cascade by increasing the number of available communication links between two switch nodes.

7. A computer interconnection system according to claim 1 wherein a dynamic switch node may have a given end-point address associated with either an end-point switch port or with an attached cross-link group, but not both.

8. A computer interconnection system according to claim 1 wherein a cross-link group provides the collection of all cross-links between two individual switches.

9. A computer interconnection system according to claim 1 wherein each dynamic switch node is provided with the port numbers of the end-point switch ports; the end-point address associated with each end-point switch port; the set of port numbers associated with each cross-link group; and the set of end-point addresses associated with each cross-link group.

10. A computer interconnection system according to claim 1 further comprising means for prioritizing selection of an idle cross-link in a group link group so that said frame information including said source endpoint address and said destination endpoint address of any two intitation frames simultaneously passing each other in a cross-link group will pass each other on the same cross-link.

11. A computer interconnection system according to claim 1 further comprising means for prioritizing selection of an idle cross-link in a group link group so that said frame information including said source endpoint address and said destination endpoint address of any two intitation frames simultaneously passing each other in a cross-link group will pass each other on the same cross-link, and each switch has an internal port address value, and between any two switches priority is determined by the switch having a higher internal port address value assigned to its internal port.

12. A computer interconnection system according to claim 1 wherein each initiation frame information has the end-point address in the frame information having a value, and the end point address value provides relative priority between any two initiation frames passing each other on a cross link.

13. A computer interconnection system according to claim 1 wherein connections between said circuit switches in the network are made on a priority attempt basis, with a higher priority address attempted first, followed by a lower priority address, but where addressing conflicts or inhibiting conditions exist which do not permit a higher priority connection to be made, a lower priority transfer of said frame information is transmitted.

* * * * *